(12) United States Patent
Dropsit et al.

(10) Patent No.: US 9,969,149 B2
(45) Date of Patent: May 15, 2018

(54) POLYMER MATERIAL BASED ON POLYLACTIC ACID

(75) Inventors: Sophie Dropsit, Bethune (FR);
Philippe Dubois, Braives (BE);
Laurent Paternostre, Ath (BE);
Francois Rase, Jambes (BE); Olivier Talon, Rouen (FR)

(73) Assignee: AGC Glass Europe, Louvain-La-Neuve (BE)

( * ) Notice: Subject to any disclaimer, the term of this patent is extended or adjusted under 35 U.S.C. 154(b) by 56 days.

(21) Appl. No.: 14/128,956

(22) PCT Filed: Jun. 6, 2012

(86) PCT No.: PCT/EP2012/060732
§ 371 (c)(1),
(2), (4) Date: Dec. 23, 2013

(87) PCT Pub. No.: WO2012/175338
PCT Pub. Date: Dec. 27, 2012

(65) Prior Publication Data
US 2014/0134441 A1 May 15, 2014

(30) Foreign Application Priority Data

Jun. 23, 2011 (BE) .................................. 2011/0380
Nov. 7, 2011 (EP) .................................. 11188045

(51) Int. Cl.
| | | |
|---|---|---|
| *B32B 17/06* | (2006.01) | |
| *B32B 17/10* | (2006.01) | |
| *B32B 27/18* | (2006.01) | |
| *B32B 27/22* | (2006.01) | |
| *B32B 27/36* | (2006.01) | |
| *C08G 63/02* | (2006.01) | |
| *C08G 63/06* | (2006.01) | |
| *C08G 63/08* | (2006.01) | |
| *C08L 67/04* | (2006.01) | |
| *C08K 5/10* | (2006.01) | |
| *C08K 5/11* | (2006.01) | |
| *C08K 5/1515* | (2006.01) | |
| *C08K 5/00* | (2006.01) | |
| *C08K 3/34* | (2006.01) | |
| *C08K 5/20* | (2006.01) | |

(52) U.S. Cl.
CPC .. *B32B 17/10779* (2013.01); *B32B 17/10605* (2013.01); *B32B 17/10697* (2013.01); *B32B 27/22* (2013.01); *B32B 27/36* (2013.01); *B32B 27/365* (2013.01); *C08K 5/0016* (2013.01); *C08K 5/10* (2013.01); *C08K 5/11* (2013.01); *C08K 5/1515* (2013.01); *B32B 17/06* (2013.01); *B32B 17/064* (2013.01); *B32B 17/10* (2013.01); *B32B 17/1055* (2013.01); *B32B 27/18* (2013.01); *B32B 2250/03* (2013.01); *B32B 2264/10* (2013.01); *B32B 2307/50* (2013.01); *B32B 2307/558* (2013.01); *B32B 2307/5825* (2013.01); *B32B 2307/746* (2013.01); *B32B 2315/08* (2013.01); *B32B 2367/00* (2013.01); *C08G 63/02* (2013.01); *C08G 63/06* (2013.01); *C08G 63/08* (2013.01); *C08K 3/34* (2013.01); *C08K 5/00* (2013.01); *C08K 5/20* (2013.01); *C08L 67/04* (2013.01); *Y10T 428/31616* (2015.04); *Y10T 428/31786* (2015.04); *Y10T 428/31794* (2015.04)

(58) Field of Classification Search
None
See application file for complete search history.

(56) References Cited

U.S. PATENT DOCUMENTS

| | | | | |
|---|---|---|---|---|
| 5,296,229 A | * | 3/1994 | Grandjean | A61L 15/26 424/444 |
| 5,434,004 A | * | 7/1995 | Ajioka | B32B 27/06 428/395 |
| 5,763,513 A | * | 6/1998 | Suzuki | C08K 3/36 264/210.6 |
| 5,801,224 A | * | 9/1998 | Narayan | C08G 63/08 524/47 |

(Continued)

FOREIGN PATENT DOCUMENTS

| | | | | |
|---|---|---|---|---|
| JP | 11-116788 | | * | 4/1999 |
| JP | 11-116788 A | | * | 4/1999 |

(Continued)

OTHER PUBLICATIONS

International Search Report dated Jul. 2, 2012, in PCT/EP12/060732 filed Jun. 6, 2012.

(Continued)

*Primary Examiner* — Vivian Chen
(74) *Attorney, Agent, or Firm* — Oblon, McClelland, Maier & Neustadt, L.L.P.

(57) ABSTRACT

The invention relates to a polymer material comprising a mixture of: a base polylactic acid (PLA) polymer formed by between 60 wt.-% and 85 wt.-% L units and between 15 wt.-% and 40 wt.-% D units or between 60 wt.-% and 85 wt.-% D units and between 15 wt.-% and 40 wt.-% L units; and a plasticizer selected from the group containing citric acid esters, glycerin esters and derivatives, poly(alkylene ethers), oligomers of lactide or derivatives of lactic acid, fatty acid esters and epoxidized oils, representing between 10 wt.-% and 40 wt.-% in relation to the total weight of the polymer material.

2 Claims, No Drawings

(56) References Cited

U.S. PATENT DOCUMENTS

| | | | | |
|---|---|---|---|---|
| 5,849,374 A * | 12/1998 | Gruber | B32B 27/08 | 428/212 |
| 5,849,401 A * | 12/1998 | El-Afandi | B32B 27/08 | 156/244.11 |
| 5,908,918 A * | 6/1999 | Chen | C08L 67/04 | 523/124 |
| 6,005,068 A * | 12/1999 | Gruber | A61L 15/26 | 428/411.1 |
| 6,117,928 A * | 9/2000 | Hiltunen | C08J 5/18 | 523/124 |
| 6,284,383 B1 * | 9/2001 | Nishiyama | A01G 9/1438 | 428/430 |
| 2002/0039649 A1 | 4/2002 | Nagai | B32B 17/10036 | 428/328 |
| 2002/0054993 A1 * | 5/2002 | Nagai | B32B 17/10036 | 428/328 |
| 2003/0216496 A1 * | 11/2003 | Mohanty | B29C 67/24 | 524/284 |
| 2004/0143072 A1 * | 7/2004 | Lewis | C08G 63/06 | 525/417 |
| 2006/0008639 A1 * | 1/2006 | Kuno | A01G 9/1438 | 428/328 |
| 2006/0046034 A1 * | 3/2006 | Schober | B32B 17/10018 | 428/195.1 |
| 2006/0110593 A1 * | 5/2006 | Fukatani | B32B 17/10036 | 428/328 |
| 2006/0217476 A1 * | 9/2006 | Okamoto | C08K 5/10 | 524/287 |
| 2007/0134487 A1 * | 6/2007 | Marumoto | B32B 17/10036 | 428/323 |
| 2007/0224340 A1 * | 9/2007 | Hatta | B32B 17/10678 | 427/160 |
| 2009/0029176 A1 * | 1/2009 | Nishida | B32B 15/08 | 428/421 |
| 2009/0054572 A1 * | 2/2009 | Kamikawa | C08L 67/04 | 524/317 |
| 2009/0148713 A1 * | 6/2009 | Lee | B32B 7/10 | 428/458 |
| 2009/0162683 A1 * | 6/2009 | Douard | C08K 5/42 | 428/480 |
| 2011/0054089 A1 * | 3/2011 | Kishimoto | C08G 63/912 | 524/114 |

FOREIGN PATENT DOCUMENTS

| | | | |
|---|---|---|---|
| JP | 11-323113 | * | 11/1999 |
| JP | 2006-063302 | * | 3/2006 |
| JP | 2006-63302 | | 3/2006 |
| JP | 2007-217638 A | * | 8/2007 |

OTHER PUBLICATIONS

Ljungberg, et al., "Film Extrusion and Film Weldability of Poly(lactic acid) Plasticized with Triacetine and Tributyl Citrate", Journal of Applied Polymer Science vol. 88, No. 14, XP-002483925, Jan. 1, 2003, pp. 3239-3247.

Quynh, et al., "Properties of crosslinked polylactides (PLLA & PDLA) by radiation and its biodegradability", European Polymer Journal, vol. 43, No. 5, XP022055176, 2007, pp. 1779-1785.

* cited by examiner

POLYMER MATERIAL BASED ON POLYLACTIC ACID

The present invention relates to the field of biosourced and biodegradable biopolymers based on derivatives of polylactic acid and to their use in the glassmaking field, in particular as interposed film in laminated glasses.

Polylactic acid or polylactic acid (PLA) polymer, the term used in the claims, is a well known biosourced and biodegradable polyester.

PLA can be obtained by lactide ring-opening polymerisation, the lactide itself being obtained by controlled depolymeristion of oligomers of lactic acid derived from maize starch or sugar beet, for example.

The lactic acid forming the base unit of PLA is a chiral molecule having two enantiomers L and D. The proportion of D structural units of opposed configuration in a PLA, i.e. of D structural units of PLLA or L structural units of PDLA, defines its optical purity. A PLLA will be all the more optically pure when its proportion of D structural units is low. A number of properties of PLAs are linked directly or indirectly to their optical purity, e.g. PLAs with a high optical purity crystallise more easily than PLA with a low optical purity.

PLA has been the subject of intense chemical studies and modifications in order to advantageously substitute it for polymers derived from the petrochemical industry, which pose environmental problems and are likely to become toxic for human beings. Some of these worth mentioning are the slow degradation of these polymers and the toxicity of the residues formed by their incineration that will be found in the food chain.

Furthermore, PLAs and modified PLAs are preferred over other biopolymers such as starch or derivatives of cellulose that exhibit poorer mechanical performance and low resistance to UV rays.

Applications of PLA or modified PLA polymers primarily lie in food packaging and in the medical field (gloves), where the properties of transparency, impact resistance and resistance to heat and humidity are sought.

In the glassmaking field laminated glass is currently used as safety glass in architectural applications and also for windscreens in automobiles and the like. The classically used film interposed between two glass sheets is an EVA (ethylene vinyl acetate) type of polymer, polyurethane or PVB (polyvinyl butyral). Taking into account the environmental problems caused by such polymers and their constantly increasing costs, the objective has been to replace them in laminated structures with foils or films of PLAs or modified PLAs. However, it is necessary that the latter biopolymers exhibit adequate thermo-mechanical properties to meet the requirements of transparency over time, mechanical strength, i.e. elastic deformation, glass transition temperature (Tg), elongation at break. impact energy and brittleness, and a good adhesion to the glass.

Unmodified PLA films do not enable these objectives to be achieved because of their low flexibility and poor adhesive properties at temperatures below 60° C., on the one hand, and, on the other hand, because they exhibit undesirable flexibility rates at temperatures above 60° C., which restrict their uses.

To remedy these disadvantages and to obtain the desired thermo-mechanical properties for these polymers, it has been proposed to use grades of PLA characterised by a lower optical purity, i.e. by a high proportion of D structural units in a PLLA or respectively of L structural units in a PDLA. In fact, studies have shown that a fraction of more than 10% of L structural units in a PLLA or respectively of L structural units in a PDLA had a beneficial effect on the crystallisation of PLA by reducing it, which prevents the production of materials that have an undesirable opacity.

Another method consists of a plasticisation possibly coupled with a cross-linkage of the base PLA.

Since said base PLA has a high Young's modulus (about 2500 MPa—ISO 527), while conversely exhibiting poor rates of elongation at break of a few percent and a low impact resistance, it cannot be used as such in laminated glasses, for example, to reproduce the performance of PVB. This disadvantage can be avoided according to embodiments by incorporating into the base PLA a suitable plasticiser in order to increase the mobility of the PLA chains, the effect of which is a decrease in Tg typically to ambient temperature and an increase in elongation at break. However, the chosen plasticiser must additionally be easily miscible with the PLA, have durability in the long term and not exude from the mixture. The nature, the incorporation rate as well as the molecular mass of the plasticiser influence these effects. The choice of plasticiser is thus subject to a compromise between the properties sought.

Generally, the appropriate plasticisers for PLA are those of the chemical class of triesters such as citrates, acetyl citrates and glycerol esters, polyalkylene ethers such as polyethylene glycol (PEG) and its derivatives, lactide oligomers or lactic acid derivatives. Certain studies have shown that fatty acid esters and epoxidised oils, e.g. based on soybean oil, palm oil or linseed oil, can also be acceptable. The proportion incorporated into the PLA varies between 3% and 30% by weight.

In summary, a suitable plasticiser in a PLA composition allows a combined reduction of Tg, melting temperature and crystallisation temperature causing a reduction in the Young's modulus and the breaking stress, but also an increase in the elongation at break.

Patent application KR 2008-0043041 discloses a composition comprising a PLA resin and a plasticiser chosen from the group comprising an acetylated monoglyceride, a citrate derivative such as tributyl citrate and a mixture thereof. This enables a modified PLA to be obtained that is biocompatible and has an increased impact resistance. However, this document does not mention any influence of the relative proportion of D-lactic acid or L-lactic acid structural units in the PLA on these properties.

Patent Application US 2008/0213209 describes PLAs that are cross-linked and plasticised by collophane, which is based on organic acids of the family of diterpenes called resin acids. However, there is no indication of any influence on the optical purity of PLA.

Therefore, the presence of plasticiser is necessary to improve the properties of PLA, but two other criteria that must be met with respect to their sought properties are the durability of PLA compositions/plasticiser, in particular avoiding exudation of the plasticiser, and the absence of crystallisation of the PLA, since this causes opacification, even also an increase in the rigidity of the material, both of which are undesirable. Thus, crystallisation could be assisted by the reduction of the Tg caused by the addition of the plasticiser.

To provide a PLA material that can be advantageously substituted for polymers derived from the oil industry that nevertheless exhibits their mechanical properties specified above, the Applicant has found a new formulation of plasticised PLA that also overcomes the disadvantages of the prior art.

Therefore, the invention relates to a polymer material comprising a mixture of a base polylactic acid (PLA) polymer comprising 60% to 85% by weight of L structural units and 15% to 40% by weight of D structural units or 60% to 85% by weight of D structural units and 15% to 40% of L structural units, and a plasticiser selected from the group comprising citric acid esters, glycerol esters and derivatives, polyalkylene ethers, lactide oligomers or derivatives of lactic acid, fatty acid esters and epoxidised oils, the content of which ranges between 10% and 40% by weight in relation to the total weight of the polymer material.

The Applicant has directed their research towards formulations that allow physical properties (Tg, Young's modulus, deformation behaviour) to be obtained that are close to those of currently commercially available interlayers of laminated glasses (polyvinyl butyral (PVB), ethylene vinyl acetate (EVA), thermoplastic polyurethane (TPU), ionomer resin, . . . ), and this renders a film obtained from this material highly usable as intermediate film in a laminated glass. The properties of interest are in particular:
- the Tg, which advantageously lies in the range of between 0° C. and 35° C., in particular between 5° C. and 25° C., i.e. close to the ambient temperature;
- a deformation behaviour of a plastic or elastic nature;
- a Young's modulus (E) (measured in accordance with ISO 527) in the range of between 0.1 and 300 MPa, preferably in the range of between 1 and 300 MPa;
- an elongation at break ($\epsilon$) advantageously in the range of between 50% and 800%, preferably between 200% and 600%;
- a breaking stress ($\sigma$) in the range of between 5 and 70 MPa, in particular between 15 and 50 MPa;
- transparency, and
- thermal stability or ageing resistance.

The Applicant has shown that the chemical nature of the plasticiser, its rate of incorporation as well as its molecular mass can unfavourably influence the desired properties of the polymer material if they are not chosen wisely. Thus, it has been shown that it is preferable to use a rate of incorporation not exceeding 40%, preferably not exceeding 25%, to prevent it exuding from the material, wherein such exudation can also be observed if the other conditions are not met. Moreover, it must not be volatile at the production temperatures of the material. Preference is given to citric acid derivative types of plasticisers.

Advantageously, the plasticiser is selected from the group comprising citric acid esters, glycerol esters and polyalkylene ethers, corresponding derivatives thereof and mixtures thereof. It is, of course, preferable that the plasticiser is also biodegradable.

The citric acid esters are preferably alkyl derivatives of these esters such as triethyl citrate, n-tributyl citrate (TBC), n-hexyl citrate, and acetylated derivatives of these esters such as acetyl citrate, acetyl triethyl citrate, acetyl n-tributyl citrate and acetyl n-trihexyl citrate.

The glycerol esters and their derivatives are advantageously mono-, di-, triglycerides as well as acetylated and/or alkylated derivatives thereof and mixtures thereof such as glyceryl triacetate (TAC).

The polyalkylene ethers are preferably polyethylene glycol (PEG) or polypropylene glycol (PPG) and their derivatives.

Epoxidised oils such as soyabean oil, palm oil or linseed oil can also be suitable.

It is highly advantageous if the plasticisers are citric acid esters, in particular n-tributyl citrate (TBC), glycerol esters and their respective derivatives and mixtures.

The plasticiser content preferably lies in the range of between 15% and 30% by weight and more preferred between 20% and 25% by weight in relation to the total weight of the polymer.

The number average molecular masses (Mn) of the base PLA preferably range between 50000 and 200000, more preferred between 70000 and 180000, advantageously between 70000 and 150000. The Applicant has shown that such Mn values of the base PLA are those that provide the best results in terms of the sought properties. The Mn values of the PLAs can be measured by SEC, the molecular mass calibration of which is conducted with polystyrene standards (PS).

The base PLAs that can be used are primarily those that are commercially available.

As an example, amounts of TBC and TAC in the range of between 10% and 30% were added to two samples of PLA, in which the proportions of D structural units are 11% and 12.1% respectively. For these value ranges the Tg ranges between 18° C. and 34° C. and these Tg values remain globally stable during the course of ageing tests over more than 12 months at ambient temperature.

They can also be synthesised in particular from a mixture of L-lactide and D-lactide monomers with a catalyst/primer system formed by an organotin such as tin ethylhexanoate, triphenylphosphine and an alcohol such as octanol in the presence of a phenyl type organic solvent such as toluene. The mixture is heated under reflux at high temperature, typically 190° C., for a period of 0.5-1 hour. The residual lactide and the low oligomers are eliminated by precipitation in methanol. The proportion of each L-lactide and D-lactide monomer determines the proportion of D structural units in the base PLA.

In the polymer material the base PLA comprises 60% to 85% by weight of L structural units and 15% to 40% by weight of D structural units or 60% to 85% by weight of D structural units and 15% to 40% of L structural units, advantageously 15% to 30% of L structural units or D structural units and 70% to 85% by weight respectively of D structural units or L structural units. One of the important aspects of the invention rests in the relative content of one of the isomers in relation to the other. Therefore, it is actually the relative proportion that contributes to the sought effects. These proportions allow a good transparency of the PLA to be obtained by reducing its crystallinity. Moreover, the Applicant has surprisingly shown that the proportion of plasticiser and the proportion of structural units of opposed configuration must be within the abovementioned ranges, since outside these the desired technical effect will not be achieved, in particular because of excessive E value (Young's modulus), typically above 300 MPa, which results in an unacceptable rigidity of the material for the desired applications.

Moreover, to remedy any problems of exudation of the plasticiser and obtain the desired properties such as the absence of crystallisation or the achievement of an elastic deformation behaviour even more easily, the base PLA in the polymer material is advantageously modified by cross-linkage of its chains. The polymer material containing the cross-linked PLA and the above plasticiser enables in particular the prevention of a total exudation of the plasticiser from the material, which will preserve the flexibility thereof. Moreover, modification of the base PLA by cross-linkage can also enable a reduction in the contact adhesion of the polymer material according to the invention, in particular the contact adhesion of the films based on the polymer material of the invention, e.g. when they rolled up for storage or transport.

The cross-linking agent of the chains of the base PLA is usually selected from methacrylic and acrylic copolymers possibly having glycidyl functional groups such as joncryl (formula c)); isocyanurate derivatives, preferably allyl derivatives such as triallyl isocyanurates (TAIC—formula a)); organic peroxides such as dicumyl peroxide (DCP—formula b)); and mixtures thereof, or any other multifunctional molecule capable of leading to a partial cross-linkage of the PLA by radical reaction along the chain of the PLA or by reaction with the ends of the PLA chains, for example, as well as the cited mixtures of molecules together or with other multifunctional molecules.

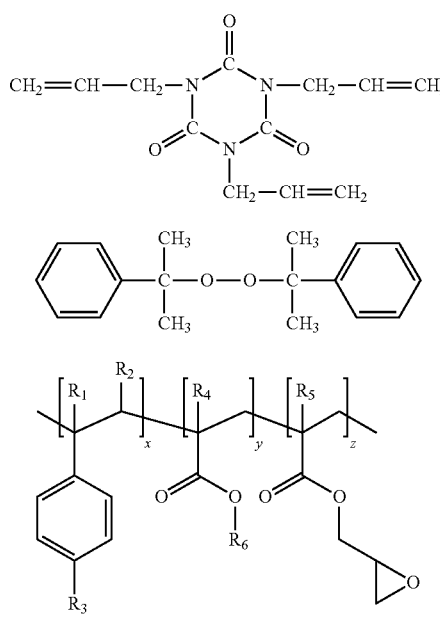

In the compound of formula c), $R_1$ to $R_5$ preferably represent, independently, H or a $C_1$-$C_3$ alkyl group or combination thereof, $R_6$ preferably represents a $C_1$-$C_3$ alkyl group; x, y and z are in the range of between 1 and 20. An example of such a compound is commercially available under the name Joncryl ADR 4368-CS from BASF.

The content of cross-linking agent is preferably 5% by weight at most in relation to the total weight of the modified PLA and advantageously lies in the range of 0.1%-5%, in particular between 0.5% and 4%.

The thermal stability of the polymer material must also be assured, since to be effective the plasticisation and, if applicable, cross-linkage are conducted at temperatures above 150° C., even in the order of 180° C.-200° C., in a kneader or mixer or also in an extruder. The plasticisation and cross-linkage can be conducted concomitantly or in a sequenced manner.

The invention also relates to a film or foil formed from a polymer material such as defined above.

The thickness of the film is preferably in the range of between 0.1 and 3 mm.

For the formation of this film, the polymer material advantageously additionally includes additives selected from the group comprising anti-blocking agents intended in particular to reduce the phenomena of contact adhesion, stabilising agents in particular with respect to UV radiation, absorbing agents (UV and infrared radiation), antistatic agents.

Anti-blocking agents are typically compounds that prevent the contact adhesion of films based on the polymer material of the invention, in particular when they are rolled up for storage or transport. These are typically talc, silica, mica, kaolin, perlite, wollastonite, titanium dioxide and diatomaceous earths (e.g. kieselguhr), which are in the form of a very finely ground powder or organic molecules such as fatty acid amides, e.g. an erucamide. These are typically added so that the content is 0.1% to 4% by weight in relation to the total weight of the polymer material. When used, this agent advantageously provides a solution to the problems of the film adhering to itself upon contact during storage, e.g. on rolls, while retaining the transparency of the polymer material.

Stabilising agents are used to prevent any degradation, in particular oxidative or thermo-oxidative degradation, of the polymer material during the course of its production where such is the case. The agents are those classically used such as phosphite derivatives.

The preparation of the polymer material is preferably conducted by mixing the PLA, the plasticiser and, if applicable, the cross-linking agent at temperatures higher than 150° C. even in the order of 180° C.-200° C., to be effective in a kneader or mixer, e.g. Brabender brand, or also by extrusion using known technologies and devices. The material is, for example, a resin in the form of granules. Cross-linkage is possible because of the high temperature, e.g. by generating radical systems both by cross-linking agent and by those of the PLA, which causes the cross-linkage.

According to the embodiments, when the cross-linkage step is implemented, this is conducted concomitantly with the step of adding plasticiser. The plasticisation and cross-linkage can therefore be conducted concomitantly or in a sequenced manner.

Like the interlayers currently used in laminated glasses, the films of the polymer material can be obtained using methods that are well known in the technical field of plastic film production, e.g. by extrusion casting, extrusion blow-moulding or also by thermoforming.

The thermo-mechanical parameters and advantages of the polymer materials according to the invention are characterised by the following measurements and tests.

DMA (dynamic mechanical analysis) tests in accordance with ASTM standards D4065, D4440 and D5279. These tests are carried out by increasing temperature from −40° C. to 170° C. at 3°/min, at 1 Hz and at 0.04% deformation in tension mode of 0.5 mm thick test pieces.

DSC (differential scanning calorimeter) tests in accordance with standard ISO 11357, which enable the Tg to be determined and the absence of undesirable signs of crystallisation to be revealed. They are carried out by increasing temperature from −40° C. to 220° C. at 10° C./min; cooling from 220° C. to −40° C. at 20° C./min; isotherm of 2 minutes; increasing temperature from −40° C. to 22° C. at 10° C./min.

tensile testing in accordance with standard ISO 527, these tests allowing measurement of the Young's modulus (E), elongation at break ($\epsilon$) and breaking stress ($\sigma$) were carried out on test pieces cut out by hollow punch in thermoformed plates at a traversing speed of 10 mm/min.

steric exclusion chromatography (SEC), which allows determination of the different number (Mn) and weight (Mw) average molecular masses, in particular for the synthesis polymer materials. The internal standards are polystyrenes.

The invention also relates to a substrate coated with the film formed essentially from the polymer material of the invention.

In the context of the invention, substrate preferably represents a glass substrate, which is advantageously transparent, a transparent glass substrate coated with at least one functional layer, such as an anti-reflective layer, low-emissivity (low-E) layer, solar control layer, sodium ion barrier layer and a layer for neutralising colours in reflection. Substrate can also stand for mirrors, glass substrates coated with lacquer layers for decorative applications. The preferably transparent substrate can be a polycarbonate- or polymethyl methacrylate-based polymer material.

Another aspect of the invention is a laminated assembly comprising at least two substrates, wherein between the at least two substrates said assembly comprises at least one interposed film of impact- and tear-resistant polymer material comprising a mixture (i) of a base polylactic acid (PLA) polymer comprising 60% to 85% by weight of L structural units and 15% to 40% by weight of D structural units or 60% to 85% by weight of D structural units and 15% to 40% of L structural units; and (ii) a plasticiser, the content of which ranges between 10% and 40% by weight in relation to the total weight of the polymer material.

Because the thermo-mechanical properties of this film are very close to those of PVB in particular, it is possible to consider in particular a laminated glass to be of "safety glazing" quality, i.e. in which in the event of glazing breakage, the fragments remain fixed to the film which means there is no risk of injuring any persons handling them or located in the vicinity. Such glazing systems are advantageously used as windscreens for motor vehicles or in any other known application.

The plasticisers used are preferably those cited above.

It is also advantageous to incorporate cross-linking agents and various other additives into the polymer materials, such as those described above, in order to configure the film of the invention and the laminated assembly containing it.

Preferably, at least one of the substrates of the laminated assembly is a glass substrate. Glass substrate is not limited in itself and typically represents clear, extra clear, coloured soda-lime or borosilicate float glass, which are transparent, the thicknesses of which are in the range of between about 1 mm and 8 mm. Extra clear glass is understood to be a glass comprising a maximum iron content, expressed in the form of $Fe_2O_3$, of less than 0.04% by weight, in particular less than 0.02%. Clear glass is understood to be a glass comprising a maximum iron content, expressed in the form of $Fe_2O_3$, ranging from 0.04% to 0.4% by weight. It can also be a toughened or semi-tempered glass.

According to embodiments, at least one of the substrates of the laminated assembly is made from polymer, typically polycarbonate or polymethyl methacrylate. According to other embodiments, one of the substrates is a glass substrate and the other is a polymer substrate as above.

It can be envisaged to use this film in laminated glasses based on three glass substrates, wherein the film is then an interlayer between the three substrates, the intermediate substrate having the film of the invention on each of its faces.

The outer faces of the glass substrates can also have at least one functional layer coating such as an anti-reflective layer, low-emissivity layer, anti-fouling layer or a layer adapted to photovoltaic devices such as layers of doped metal oxides ($SnO_2$:F), of $TiO_2$, layers that prevent the migration of sodium ions from the glass such as layers of silicon oxycarbides, oxynitrides or oxides.

The laminated glasses are produced by techniques known per se, in particular in a similar manner to PVB film-based laminated glasses.

The following examples illustrate the invention without restricting its scope.

EXAMPLES

In all the following examples the polymer materials with the base PLA, in which plasticisers, cross-linking agent and other additives are incorporated, are prepared in the following manner.

The base PLA is introduced into a Brabender kneader (volume of mixing chamber=55 $cm^3$) at a temperature of 190° C. After mixing for 5-10 min. the plasticiser is incorporated at contents varying between 10% and 40% by weight in relation to the total weight of the base PLA polymer. The whole mixture is mixed at this temperature for 10 min. to obtain a homogeneous polymer material. This is then thermoformed at 190° C. under a pressure of 130 bar to obtain discs that are 10 cm in diameter and 0.5 mm thick.

The polymer materials that comprise a cross-linking agent in addition to the plasticiser are prepared in the following manner.

3% by weight of cross-linking agents (or cross-linkers), Joncryl ADR 4368-CS from BASF and DCP respectively, are incorporated before adding the plasticiser and after introducing the base PLA as above. The whole mixture is mixed for about 5 min. and the plasticiser is then incorporated. The subsequent steps are those described above. In the case where two different cross-linking agents are added, 1.5% by weight of the first cross-linking agent is incorporated and mixed for 5 min. and 1.5% of the second cross-linking agent is incorporated followed by mixing for 5 min.

The synthesis of base PLA having a proportion of PDLA isomers in the range or between 15% and 40% by weight is conducted with two samples of polymer grade lactides, one being a lactic acid dimer, L isomers, the other being a racemic mixture of lactic acid dimers, L and D isomers. Contents varying between 15% and 40% by weight of D structural units are obtained, depending on the respective quantity of each sample. A catalyst/primer system composed of tin ethylhexanoate, triphenylphosphine and octanol (lactide/tin ethylhexanoate=4500, lactide/octanol=420, tin ethylhexanoate/triphenylphosphine=1) is used in the presence of toluene. The mixture is heated under reflux at 190° C. for 35 min. The residual lactide and the low oligomers are eliminated by precipitation in methanol and the base PLA is then dried in vacuum at 60° C. to completely eliminate the solvent.

Base PLAs with a proportion of PDLA isomers of less than 15% were selected from the industrial grades available from Natureworks. The relative proportion of L-lactide and D-lactide determines the optical purity of the base PLA.

The quantities of additives added are expressed in percentages by weight of the total for each formulation mentioned in the following examples.

Example 1

A formulation of polylactic acid (PLA), to which a plasticiser, n-tri-butyl citrate (TBC), has been added to a content of 20% (Sample A), is studied. It has a proportion of D structural units of 30%.

A Sample B characterised by a proportion of D structural units of 12% and comprising a proportion of TBC of 5% was studied for comparison.

Table 1 indicates the development of the Tg of the formulations and the mechanical properties thus obtained.

By way of example, Table 1 also includes the values of these properties for PVB.

TABLE 1

| Sample | % D | Plasticiser | Tg (° C.) | E (MPa) | σ (MPa) | ε (%) |
|---|---|---|---|---|---|---|
| A | 30 | 20% TBC | 15.9 | 25 | 18 | 419 |
| B (comparative) | 12 | 5% TBC | 49.1 | 2362 | 46 | 33.4 |
| PVB | — | — | 18.8 | 3 | 30 | 460 |

The results of Table 1 clearly indicate that the optical purity of the PLA and the content of plasticiser according to the invention allow the Tg values to be reduced and it is evident that for Sample B (comparative), the composition of which is outside the invention, the values obtained are too high in terms of the Young's modulus (E) and too low for elongation at break (ε).

Example 2

A formulation of polylactic acid (PLA), to which a plasticiser, n-tri-butyl citrate (TBC) has been added, wherein the base PLA has been cross-linked (J=joncryl ADR 4368-CS), is studied.

The following Table 2 shows the characteristics of the polymer materials: plasticiser content, proportion of D structural units, cross-linking agent content, as well as data relating to the mechanical properties of these materials.

TABLE 2

| Sample | % D | Plasticiser | Cross-linking agent | Tg (° C.) | E (MPa) | σ (MPa) | ε (%) |
|---|---|---|---|---|---|---|---|
| C | 30 | 20% TBC | 3% (J + DCP; 50/50) | 11.9 | 3 | 8 | 500 |
| D | 20 | 20% TBC | 3% J | 15.3 | 56 | 16 | 350 |
| E | 30 | 15% TBC | 3% (J + DCP; 50/50) | 21.1 | 2 | 10 | 620 |
| F | 20 | 17% TBC | 3% (J + DCP; 50/50) | 21.7 | 15 | 16 | 400 |
| G (comparative) | 12.1 | 5% TBC | 3% J | 48.2 | 2210 | 45 | 6 |

The results of Table 2 indicate that in the case of Samples C to F according to the invention the desired properties for these materials are obtained, in contrast to Sample G outside the invention where the properties are not satisfactory.

Example 3

Ageing tests enable the stability of the formulations produced to be characterised. A series of tension test pieces was thus subjected to ageing at 100° C. for one night and the thermo-mechanical properties were re-evaluated.

A formulation of polylactic acid (PLA), to which a plasticiser, n-tri-butyl citrate (TBC) has been added, wherein the base PLA has possibly been cross-linked (J=joncryl ADR 4368-CS), is studied.

The following Table 3 shows the characteristics of the polymer materials: plasticiser content, proportion of D structural units, cross-linking agent content, as well as data relating to the mechanical properties of these materials before and after the ageing step (the values after ageing are given in italics) and also indicates if a fusion peak was observed during the DSC measurement, this showing the presence of a crystalline phase in the polymer material.

TABLE 3

| Sample | % PDLA | Plasticiser | Cross-linking agent | Tg (° C.) | E (MPa) | σ (MPa) | ε (%) | Crystalline phase |
|---|---|---|---|---|---|---|---|---|
| A | 30 | 20% TBC | | 15.9 / 9.2 | 25 / 11.5 | 18 / 8 | 419 / 500 | no / no |
| C | 20 | 20% TBC | 3% (J + DCP; 50/50) | 11.9 / 16.4 | 3 / 4.8 | 8 / 5 | 500 / 420 | no / no |
| H (comparative) | 1.4 | 20% TBC | 3% DCP | 16 / 24.6 | 36 / 810 | 24 / 28 | 230 / 12 | no / yes |
| I (comparative) | 12.1 | 20% TBC | | 18 / 19 | 45 / 200 | 29 / 20 | 430 / 190 | no / yes |
| J (comparative) | 12.1 | 20% TBC | 3% J | 18.9 / 20.7 | 15 / 70 | 27 / 28 | 500 / 350 | no / yes |
| K (comparative) | 12.1 | 20% TBC | 3% (J + DCP; 50/50) | 17 / 24 | 15 / 187 | 14 / 10 | 330 / 37 | no / yes |

Samples A and C exhibit satisfactory properties before and after ageing.

In contrast, in the case of Samples H to K outside the invention the appearance of a crystalline phase is observed during ageing at high temperature, which results in unsatisfactory thermo-mechanical properties, as well as opacification of the material, which makes it unsuitable for the envisaged applications.

Example 4

Contact adhesion tests were conducted on films of polymer material of several different compositions either including anti-blocking agents or not (for comparison). Kieselguhr supplied commercially by Merck has a grain size of less than 0.1 mm. The type of erucamide used is a cis-13-docosenamide supplied commercially by Sigma-Aldrich.

These tests were conducted as follows:

Two films obtained from the described formulations were placed in contact, hydroflated by a weight of 94 g, then placed in an oven at 30° C. or 60° C. for 24 hours. After their removal from the oven an attempt is made to separate the films. If separation of the films is possible (result OK), there is no problem with contact adhesion. However, if the films cannot be separated (result KO), there is clearly a problem with contact adhesion.

The following Table 4 shows the characteristics of the tested polymer materials: plasticiser content, proportion of D structural units, cross-linking agent content, as well as data relating to the mechanical properties of these materials before and, if applicable, after the ageing step (the values after ageing are given in italics), and gives the adhesion results.

TABLE 4

| Sample | % D | Plasticiser | Cross-linking agent | Anti-blocking agent | Tg (° C.) | E (MPa) | σ (MPa) | ε (%) | Adhesion test |
|---|---|---|---|---|---|---|---|---|---|
| L₀ | 12 | 20% TBC | — | — | 17.8 | 45 | 28 | 430 | 60° C.: KO |
| L₁ | 12 | 20% TBC | — | 2% kieselguhr | 21.1 | 168 | 30 | 383 | 60° C.: OK |
| L₂ | 12 | 20% TBC | — | 4% kieselguhr | 20.2 | 180 | 29 | 321 | 60° C.: OK |
| L₃ | 12 | 20% TBC | 3% (J + DCP; 50/50) | 4% kieselguhr | 20.6 | 15 | 15 | 282 | 60° C.: OK |
| M₀ | 12 | 20% TBC | — | — | 16.2 | 14 | 26 | 420 | 30° C.: KO |
| M₁ | 12 | 20% TBC | — | 0.5% erucamide | 20.2 | 24 | 25 | 521 | 30° C.: OK |
| M₂ | 12 | 20% TBC | 3% (J + DCP; 50/50) | 0.5% erucamide | 21.5 | 15 | 15 | 326 | 30° C.: OK |
| N₁ | 30 | 20% TBC | — | 0.5% erucamide | 17.2 / 15.6 | 3 / 32 | 5 / 10 | 465 / 390 | 30° C.: KO |
| N₂ | 30 | 20% TBC | 3% J | 0.5% erucamide | 9 / 15.4 | 3 / 7 | 3 / 7 | 515 / 495 | 30° C.: OK |
| N₃ | 30 | 20% TBC | 1.5% J + 0.5% DCP | 0.5% erucamide | 16.4 / 17.3 | 3 / 10 | 7 / 9 | 500 / 460 | 30° C.: OK |

The results of this table generally show the advantage of adding kieselguhr or erucamide to a polymer material comprising a polylactic acid (PLA) polymer, a plasticiser and possibly a cross-linking agent to be able to reduce the contact adhesion of the polymer material.

The N group of samples shows that when 0.5% erucamide is added, this advantage of reducing contact adhesion is evident for PLAs with a high proportion of D, primarily when a cross-linking agent is also present in the polymer material.

The invention claimed is:

1. A laminated assembly according, comprising:
   at least two substrates, and
   an interposed film of impact- and tear-resistant polymer material comprising a mixture (i) of a base polylactic acid polymer comprising 15% to 30% by weight of a D structural unit and 70% to 85% of an L structural unit; and (ii) a plasticizer in a content of from 15% to 20% by weight based on a total weight of the impact- and tear-resistant polymer material,
   wherein one of the at least two substrates is a glass substrate,
   wherein the interposed film lies between the at least two substrates,
   wherein the plasticizer is n-tri-butyl citrate, and
   wherein a Young's modulus of the interposed film is from 2 to 56 MPa.

2. The laminated assembly according to claim 1, wherein an elongation at break of the interposed film is 350% to 620%.

* * * * *